United States Patent [19]
Tong

[11] Patent Number: 5,772,224
[45] Date of Patent: Jun. 30, 1998

[54] VEHICLE SUSPENSION SYSTEMS

[75] Inventor: Chi-Kwan Tong, Kowloon, Hong Kong

[73] Assignee: Common Engineering Company Limited, Hong Kong, Hong Kong

[21] Appl. No.: 648,328

[22] Filed: May 15, 1996

[51] Int. Cl.$^6$ .................................................. B60G 21/00
[52] U.S. Cl. ........................................................ 280/112.2
[58] Field of Search .................................. 280/112.2, 689

[56] References Cited

U.S. PATENT DOCUMENTS

| | | | |
|---|---|---|---|
| 4,277,076 | 7/1981 | Hanna | 280/112.2 |
| 4,830,394 | 5/1989 | Tanaka et al. | 280/689 |
| 5,116,069 | 5/1992 | Miller | 280/112.2 |
| 5,230,529 | 7/1993 | Harvey-Bailey | 280/707 |
| 5,529,324 | 6/1996 | Krawczyk et al. | 280/112.2 |

*Primary Examiner*—Kenneth R. Rice
*Attorney, Agent, or Firm*—Samuels, Gauthier, Stevens & Reppert

[57] ABSTRACT

A vehicle suspension system is provided for tilting a chassis 24 with respect to the axes of vehicle wheels 31 and 32 during cornering to improve the comfort of travel for occupants of the vehicle. A lateral or centrifugal force sensor mounted to the chassis 24 provides a control for a hydraulic pump to cause a piston 15 in a cylinder 14 to move to the left or right. The Figure shows the piston 15 to the left of a mean central position and its movement has caused the chassis to tip to the right. The vehicle in the Figure is shown moving away and to the right. For the corner, the tilt is stable as the sensor will remain balanced, that is not then generating further or extra tilting, until the degree of cornering changes or the vehicle straightens out. In the latter case, the sensor will respond to cause the piston 15 to move to its central position and the chassis to level off.

8 Claims, 5 Drawing Sheets

VEHICLE SUSPENSION SYSTEMS

BACKGROUND OF THE INVENTION

1. Field of the invention

The invention relates to vehicle suspension systems.

2. Description of Prior Art

It is already known especially for high performance vehicles to provide for variable suspension configurations, so-called "active suspensions", that alter the relative angle of the wheels during cornering to improve tyre grip. It has been known for very many years to fit "roll bars" that serve, by mechanically reacting between the forces on the rear wheels of a vehicle, to urge an inner wheel downwards in a turn towards a road surface against a natural tendency of such a wheel to lift upwards. Generally stated, prior art arrangements serve to make the vehicle safer or enable the vehicle to manoeuvre satisfactorily at higher speeds. However, such arrangements have the disadvantage that they do not generally make the ride more comfortable for occupants of the vehicles.

SUMMARY OF THE INVENTION

It is an object of the invention to overcome or at least reduce this disadvantage.

According to the invention, there is provided a vehicle suspension system including a vehicle chassis extending along a length of a vehicle, the chassis having sides and a front end and a rear end, supporting linkage mechanisms respectively connecting between the chassis and wheels mounted at opposite sides of the chassis that allow a relative movement of the chassis with respect to rotational axes of the wheels, in which the chassis is normally supported in a mean plane parallel to the axes of the wheels by the linkage mechanisms, a lateral force sensor mounted to the chassis that is arranged to respond to centrifugal forces applied to the chassis during cornering that occur in a direction of a lateral plane parallel to the axes of the wheels, and a prime mover arranged to be controlled by the sensor cause the chassis to tip from its mean horizonal position to the left or right so that the chassis leans into a corner during cornering.

The lateral force sensor may comprise a rod pivotably mounted at one end to the chassis, a pair of opposing electrical terminals mounted at either side of a remove end of the rod arranged to be contacted by the remote end when the rod swings due to lateral forces applied to the chassis from a mean central position to complete a respective electrical circuit.

The lateral force sensor may comprise a mercury switch arranged to complete a respective electrical circuit according to the direction of any lateral forces applied to the chassis.

The prime mover may comprise a hydraulic pump hydraulically coupled to move a piston in a cylinder. The piston may have at least one rod connected thereto, the rod being mechanically and pivotably connected to a support linkage to urge the support linkage in a manner to tip the chassis as and when required.

Each linkage may include a spring link that is arranged to damper movements of the linkages.

The linkage systems may include a shocker absorber expandable mounting strut which is arranged to extend or reduce in effective length in response to a supply of pressurised hydraulic fluid.

The expandable mounting strut may be arranged to receive pressurised fluid directly from the hydraulic pump and the said piston and the said cylinder constituted by the expandable mounting strut.

BRIEF DESCRIPTION OF DRAWINGS

Vehicle suspension systems according to the invention will be described by way of example with reference to the accompanying schematic drawings in which.

DETAILED DESCRIPTION OF PREFERRED EMBODIMENTS

Figure 1:
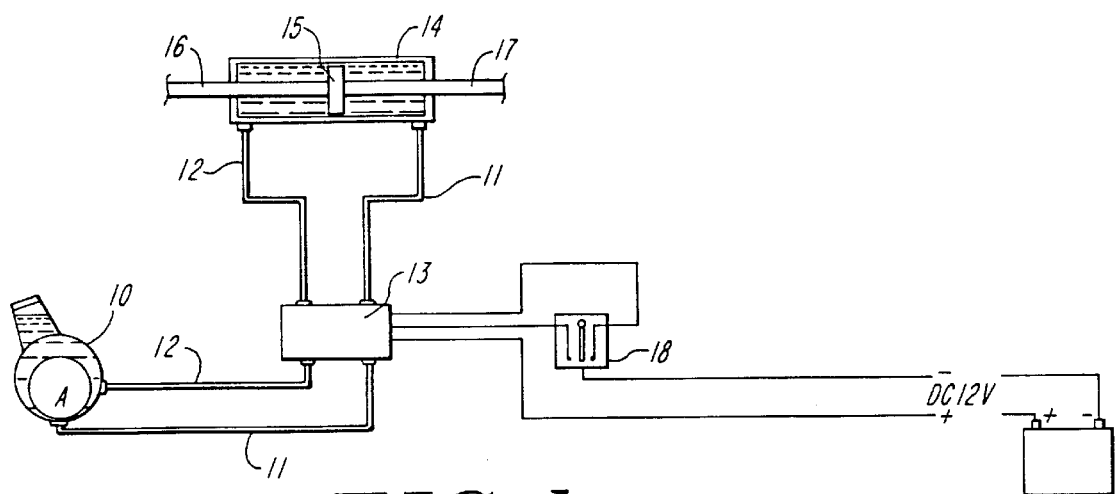
FIG. 1 shows a layout of a prime mover for a vehicle suspension system.

Referring to the drawings, in FIG. 1 a prime mover for the vehicle suspension system comprises a hydraulic pump 10 connected by pressure lines 11 and 12 via an electrically operable reversing valve 13 to a cylinder 14. A dual acting piston 15 inside the cylinder is connected to operating rods 16 and 17. The prime mover provides movement of the rods 16 and 17 in response to control signals from a lateral or a centrifugal force sensor 18, as will be explained below.

Figure 2:
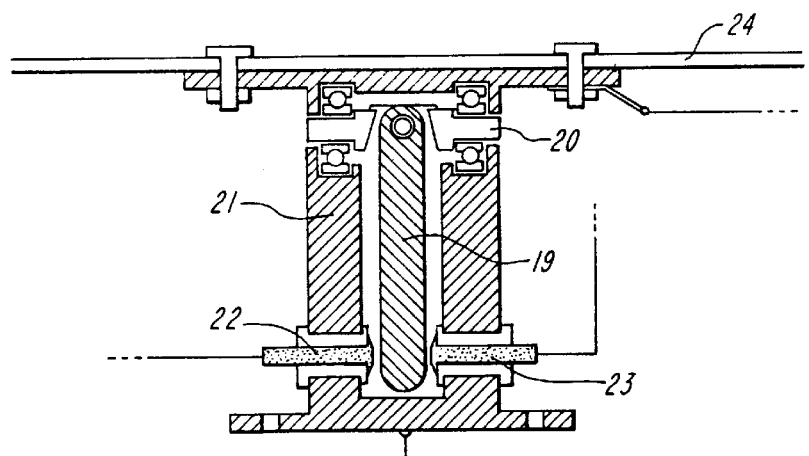
FIG. 2 shows a cross-sectional side view of a sensor for the vehicle suspension system.

The sensor 18 is shown in more detail in FIG. 2 and comprises rod 19 pivotably supported on an axle 20. The axle 20 is rotatably supported in a housing 21 that extends downwards to embrace a pair of opposing electrical terminals 22 and 23.

The housing 21 is mounted in a vehicle chassis 24 so that a central axis of the axle 20 extends laterally across the vehicle at right angles to a longitudinal axis of the vehicle. The rod 19 normally hangs vertically downwards, irrespective of the pitch of the vehicle, because the axle is rotatable, and can swing to the left and right. As a result whenever the vehicle is moving forwards and turns to the right, in relation to an orientation shown in FIG. 2, the rod 19 will swing as a result of lateral forces applied to the chassis to the left and make contact with the terminal 22. This completes an electrical circuit that controls the valve 13 so that the piston 15 is urged to the left. In a similar but opposite way, if the vehicle turns to the left, the piston will be urged, in the described system, to the left.

Figure 3:
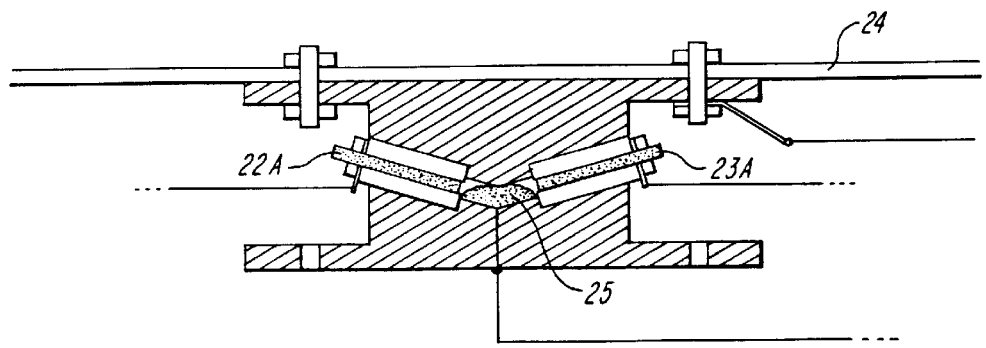
FIG. 3 shows a cross-sectional side view of another sensor for the vehicle suspension system.

In FIG. 3, a lateral force sensor includes a mercury switch. Centrifugal forces acting on the vehicle as it turns right or left, during normal forward travel, urges a pool mercury 25 to the left or right to complete one or other electrical circuits with electrical terminals 22A or 23A. This serves to select automatically, as in FIG. 2, in which direction the piston 15 is urged by the pressurised hydraulic fluid.

Figure 4:
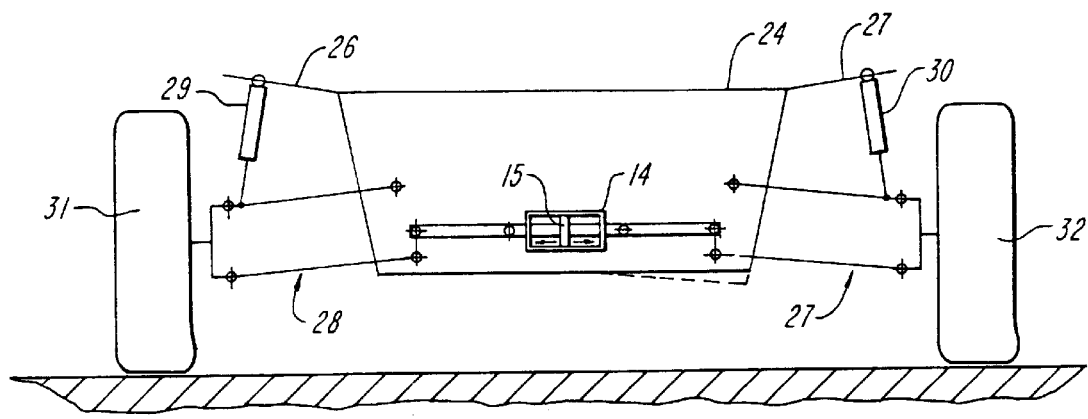
FIG. 4 shows a rear view of a vehicle suspension system having a chassis and a set of wheels.
Figure 5:
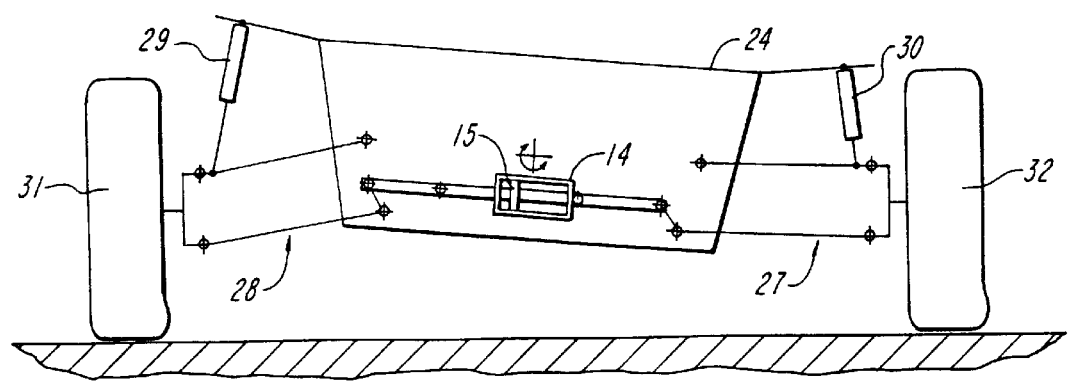
FIG. 5 shows the arrangement of FIG. 4 in a different configuration.

Referring now to FIGS. 4 and 5, the vehicle chassis 24 is formed with wings 26 that extend beyond opposing sides of the chassis. Linkage mechanisms 27 and 28 comprise a number of members pivotably linked together and pivotably mounted to the chassis. Shock absorbers 29 and 30 are respectively pivotally connected between the wings 26 and the linkage members 27 and 28. It will be appreciated that the linkage members 27 and 28 allow the chassis 24 to orient to different positions relative to central rotational axes of vehicle wheels 31 and 32. FIGS. 4 and 5 do not show all components of a usual suspension system, such as road springs that would normally be present.

FIG. 4 shows the chassis 24 in a mean or horizonal position supported by the linkages 27 and 28. This is the position that the chassis adopts when the vehicle is moving forwards in a straight direction. FIG. 5 shows the relative configuration taken up by the chassis when the vehicle is turning round a corner to the right. It will be noted that the piston 15 has moved to the left from a central position (of FIG. 4). As a result, the chassis has been tipped to the right by the action of the vehicle suspension system so as to lean into the corner. The amount of tilt or lean of the chassis is controlled by the reaction on the rod 19 (FIG. 2) to centrifugal forces. When or as soon as the lean is correctly adjusted for any particular corner, the rod 19 will lie between and out of contact with both terminals 22 and 23 and so the piston 15 will remain stationary. As soon as the vehicle straightens up out of the corner, the rod will contact the terminal 23 and the piston 15 will then be urged to the right (towards its central position) and the chassis will be levelled off automatically as required by the described vehicle suspension system. Generally, the direction, the degree and amount of chassis tilt is automatically regulated by the vehicle suspension system. The described vehicle suspension system provides a comfortable balance and ride for the occupants because the occupants will experience little or no lateral thrust from their seats during cornering. This ensures a much more comfortable ride than normally experienced with present day suspension systems.

Figure 6:
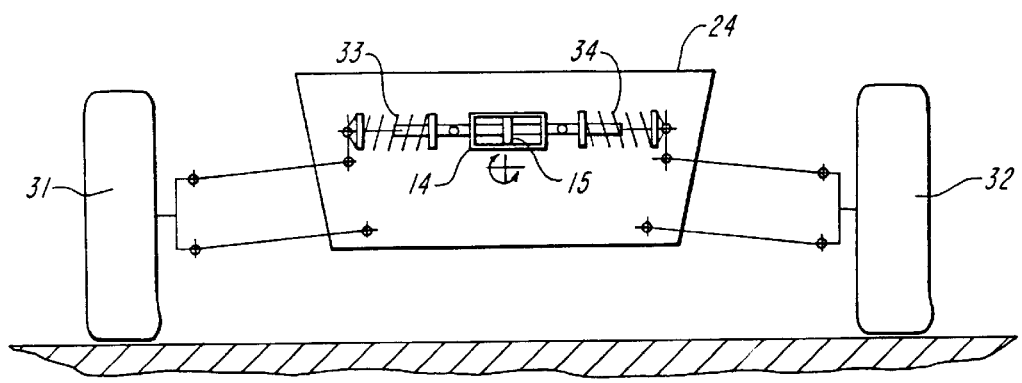
FIG. 6 shows a rear view of another vehicle suspension system having a chassis and a set of wheels.
Figure 7:
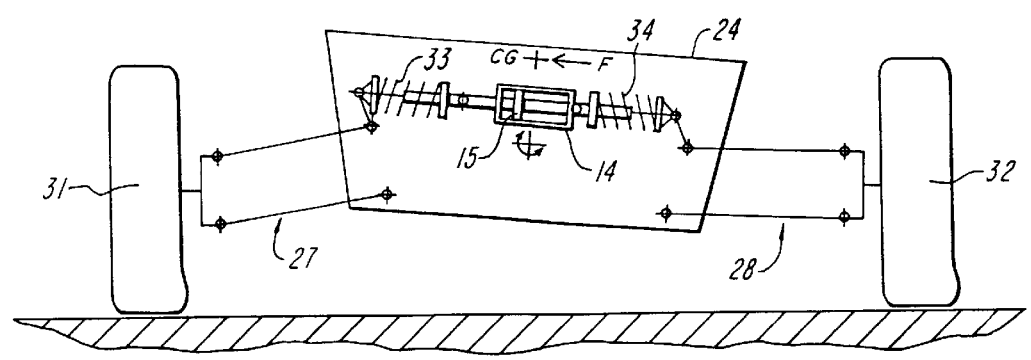
FIG. 7 shows the arrangement of FIG. 6 in a different configuration.

In FIGS. 6 and 7, the same numerals have been used for components which are the same or functionally the same as the components of FIGS. 4 and 5. FIG. 6 represents the configuration of the vehicle suspension system in straight forward motion of the vehicle and FIG. 7 represents the configuration when the vehicle is cornering to the right. Generally, the piston 15 is used as before to tilt the chassis as required and to restore the chassis to a level position when appropriate. The linkages 27 and 28 each include spring link or damper connections 33 and 34 respectively, which effectively absorb any abrupt changes in the actual or required orientation of the chassis.

Figure 8:
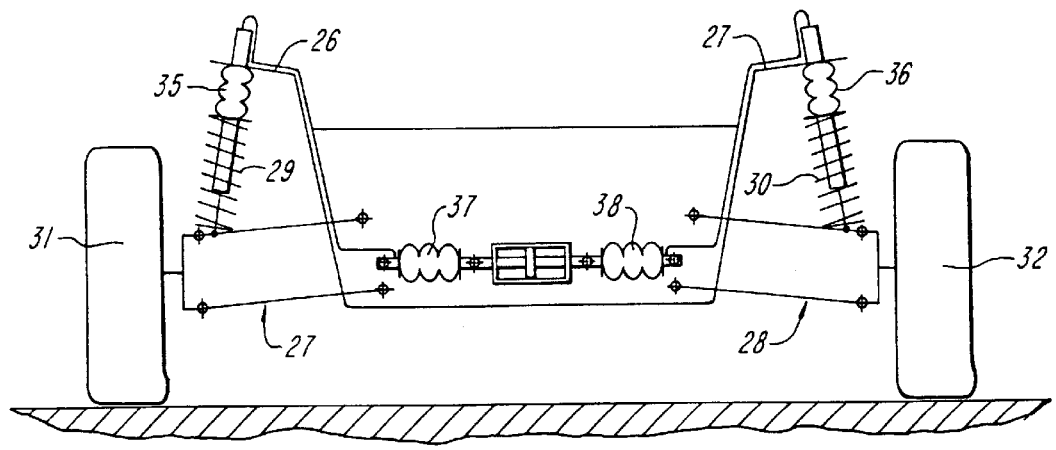
FIG. 8 shows a rear view of a further vehicle suspension system having a chassis and a set of wheels.
Figure 9:
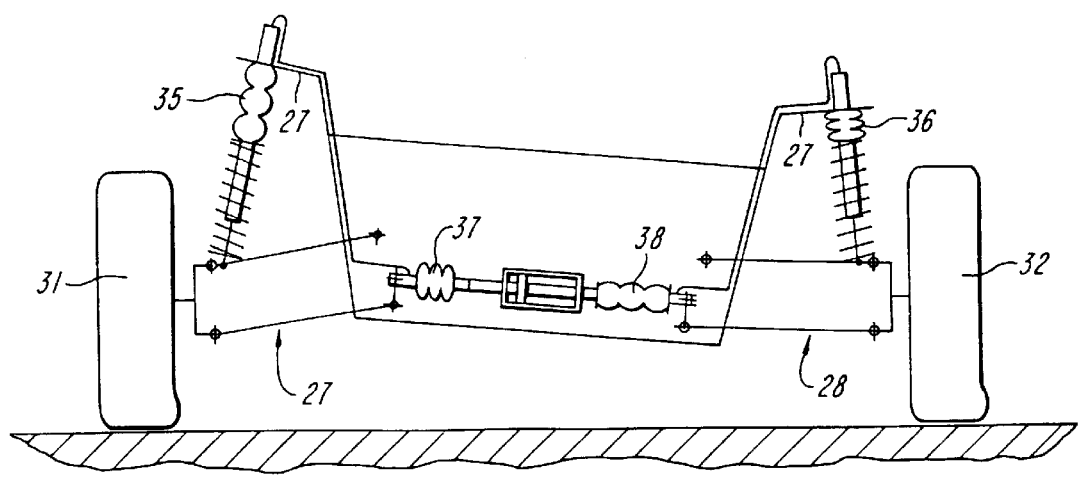
FIG. 9 shows the vehicle suspension system of FIG. 8 in a different configuration.
Figure 10:
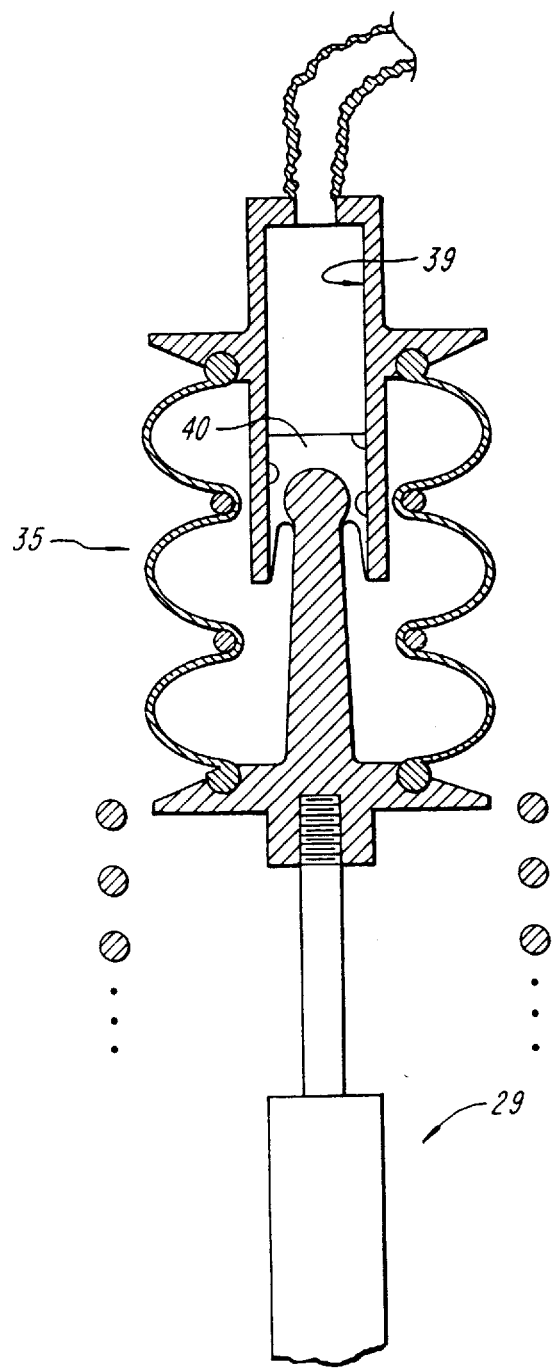
FIG. 10 shows a sectional view of a strut of the vehicle suspension system of FIGS. 8 and 9.

In FIGS. 8 and 9, a further system is shown. FIG. 9 shows a configuration of a chassis for the vehicle cornering to the right. Each shock absorber 29 and 30 is provided with a respective expandable mounting strut 35 and 36. (The mounting strut 35 is shown in more detail in FIG. 10). The mounting struts 35 and 36 are fixed to the wings 26 and 27 and are extended and reduced in effective length by hydraulic fluid pumped by auxiliary pumps 37 and 38. The pumps 37 and 38 are operated by pistons (not shown) fitted to remote ends of the rods 16 and 17 (see FIG. 1). Thus, for example, during cornering to the right, hydraulic fluid is pumped to the strut 35 to increase its effective length and so tilt the chassis to the right.

It is also possible to use hydraulic fluid fed directly from the pump 10 (FIG. 1) under the control of the sensor 18 and so dispense with the cylinder 14 and the piston 15 if preferred. The cylinder 14 is replaced by a cylinder 39 and the piston 15 is replaced by a piston 40 (see FIG. 10).

It will be appreciated that it is also possible to apply the chassis adjusting force only to one side of the described vehicle suspension systems. In other words, whereas the systems described are all symmetrical, it is possible to push and to pull, as it were, only one of the linkages 27 or 28 or in FIGS. 8 and 9 to extend and reduce the effective length of one of the mounting struts 35 or 36.

Normally, the described vehicle suspension systems are mounted and applied adjacent a vehicle rear suspension. It is however possible to sense the lateral (centrifugal) forces adjacent the rear wheels and apply a suitable tilt in accordance therewith at the center of the vehicle and/or at several places along the vehicle length. It is also possible to sense the lateral forces at more than one place along the length of the vehicle and apply one or more tilting actions at the same or different places.

I claim:

1. A vehicle suspension system including a vehicle chassis extending along a length of a vehicle, the chassis having sides and a front end and a rear end, supporting linkage mechanisms respectively connecting between the chassis and wheels mounted at opposite sides of the chassis that allow a relative movement of the chassis with respect to rotational axes of the wheels, in which the chassis is normally supported in a mean plane parallel to the axes of the wheels by the linkage mechanisms, a lateral force sensor mounted to the chassis that is arranged to respond to centrifugal forces applied to the chassis during cornering that occur in a direction of a lateral plane parallel to the axes of the wheels, and a prime mover arranged to be controlled by the sensor cause the chassis to tip from its mean horizonal position to the left or right so that the chassis leans into a corner during cornering.

2. A vehicle suspension system according to claim 1, in which the lateral force sensor comprises a rod pivotably mounted at one end to the chassis, a pair of opposing electrical terminals mounted at either side of a remove end of the rod arranged to be contacted by the remote end when the rod swings due to lateral forces applied to the chassis from a mean central position to complete a respective electrical circuit.

3. A vehicle suspension system according to claim 1, in which the lateral force sensor comprises a mercury switch arranged to complete a respective electrical circuit according to the direction of any lateral forces applied to the chassis.

4. A vehicle suspension system according to claim 1, in which the prime mover comprises a hydraulic pump hydraulically coupled to move a piston in a cylinder.

5. A vehicle suspension system according to claim 4, in which the piston has at least one rod connected thereto, in which the rod is mechanically and pivotably connected to a support linkage to urge the support linkage in a manner to tip the chassis as and when required.

6. A vehicle suspension system according to claim 5, in which each linkage includes a spring link that is arranged to damper movements of the linkages.

7. A vehicle suspension system according to claim 4, in which at least one of the linkage systems includes a shocker absorber expandable mounting strut which is arranged to extend or reduce in effective length in response to a supply of pressurised hydraulic fluid.

8. A vehicle suspension system according to claim 7, in which the expandable mounting strut is arranged to receive pressurised fluid directly from the hydraulic pump and the said piston and the said cylinder are constituted by the expandable mounting strut.

* * * * *